United States Patent [19]

Miwa et al.

[11] Patent Number: 4,705,627
[45] Date of Patent: Nov. 10, 1987

[54] ABSORPTION APPARATUS INCLUDING ROTARY VALVE

[75] Inventors: Kishio Miwa, Otsu; Makoto Kihara, Mishima; Kazuyuki Sakaya; Takehisa Inoue, both of Kamakura, all of Japan

[73] Assignee: Toray Industries, Inc., Tokyo, Japan

[21] Appl. No.: 912,472

[22] Filed: Sep. 29, 1986

Related U.S. Application Data

[63] Continuation-in-part of Ser. No. 710,527, Mar. 12, 1985, abandoned, which is a continuation of Ser. No. 463,517, Feb. 3, 1983, abandoned.

[30] Foreign Application Priority Data

Feb. 4, 1982 [JP] Japan .................................. 57-16823
Apr. 26, 1982 [JP] Japan .................................. 57-68783

[51] Int. Cl.$^4$ .......................... B01D 15/00; B01J 8/02
[52] U.S. Cl. ................................ 210/264; 137/625.46
[58] Field of Search ..................... 137/625.46, 625.11; 210/264, 278, 284, 424–426

[56] References Cited

U.S. PATENT DOCUMENTS 2,706,532  4/1955  Ringo et al. .................... 137/625.46
2,985,589  5/1961  Broughton et al. ................. 210/264
3,949,967  4/1976  Kratfel ........................... 137/625.46

FOREIGN PATENT DOCUMENTS 848026 10/1939 France ........................... 137/625.11

Primary Examiner—Ivars Cintins
Attorney, Agent, or Firm—Armstrong, Nikaido, Marmelstein & Kubovcik

[57] ABSTRACT

The present invention relates to a rotary valve for distributing a fluid in various directions and collecting fluids from various directions. The rotary valve consists of two stator disks having passages that constitute a part of complete passages through which the fluid runs, and a rotor disposed between the two stator disks and having passages which communicate with selected at least two of the passages in the stator disks to form complete passages through which the fluid runs. Each time the rotor is turned intermittently, different passages are formed through which the fluid runs.

2 Claims, 20 Drawing Figures

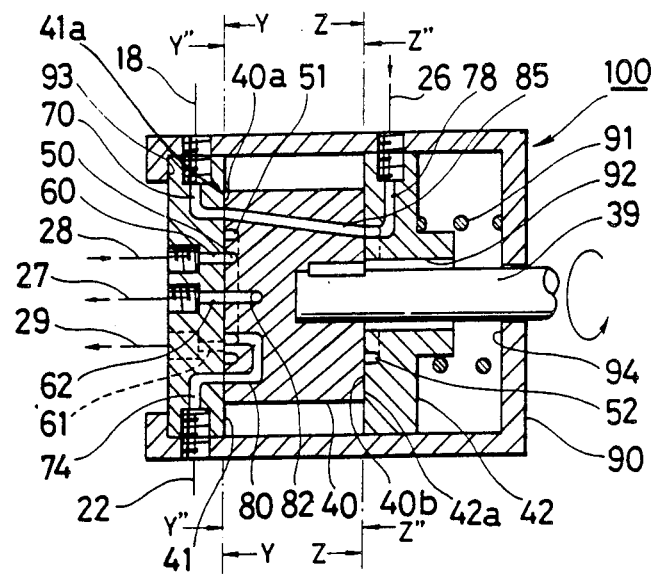
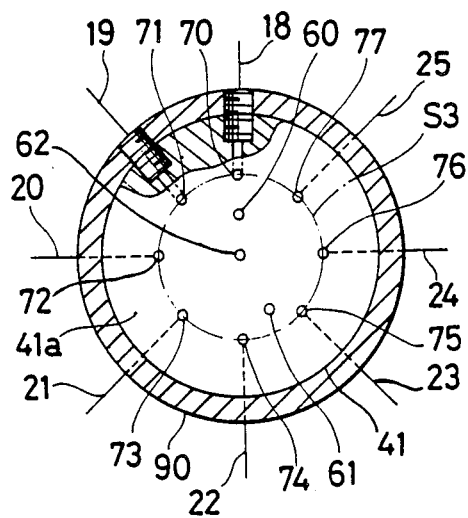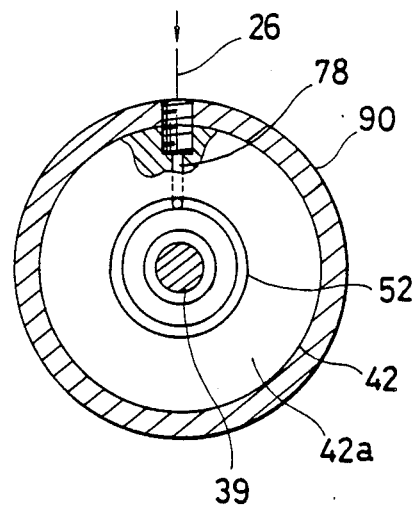

ABSORPTION APPARATUS INCLUDING ROTARY VALVE

The application is a continuation-in-part of a parent application, Ser. No. 710,527 filed Mar. 12, 1985, which was a continuation of Ser. No. 463,517 filed Feb. 3, 1983, both now abandoned.

BACKGROUND

The present invention relates to a rotary valve to distribute fluid in various directions and collect fluid from various directions. More specifically it relates to a rotary valve used in adsorptive separation equipment having a plurality of adsorbent chambers, the rotary valve distributing fluid to a certain number of adsorbent chambers and at the same time collecting fluid from a certain number of adsorbent chambers.

The adsorptive separation technique currently available using a plurality of adsorbent chambers include those employing a simulated moving bed or pressure swing adsorption.

The adsorptive separation technique employing the simulated moving bed basically consists of a desorption zone, a purification zone and an adsorptive zone which are serially and circularly interconnected in that order. Each zone comprises one or, in most cases, plural chambers connected in series, each chamber being charged with adsorbent. The fluid to be treated flows through the adsorbent chamber in a single direction of from the desorption zone to the purification zone and then to the adsorption zone.

The respective zones for separating components of a fluid mixture function as follows.

Adsorption zone:

The fluid mixture is brought into contact with the adsorbent to selectively adsorb a strong adsorptive component of the fluid mixture, withdrawing a raffinate output stream containing week adsorptive component and desorbent material to be described later.

Purification zone:

The adsorbent that has adsorbed the strong adsorptive component in the adsorption zone is brought into contact with an extract stream taken out from the desorption zone and/or a highly concentrated strong adsorptive component to improve the purity of the strong adsorptive component on the adsorbent.

Desorption zone:

The desorbent material is brought into contact with the adsorbent to displace the purified strong adsorptive component and withdraw the extract output stream containing the strong adsorptive component and the desorbent material.

Now, the one of the plurality of adsorbent chambers located at the upstream end of the desorption zone, the purification zone and the adsorption zone may be periodically shifted so as to be located at the downstream end in the adsorption zone, the desorption zone and the purification zone respectively. Each time such shifting is made, it results in that the three zones undergo a countercurrent shifting relative to the fluid flow, whereby a component-separation of the fluid mixture can be carried out continuously.

In practice, the fluid inlet and outlet ports of each zone are concurrently shifted to the span of single adsorbent chamber in fluid flow direction to thereby obtain the same operation performance attained by the shifting of adsorbent chambers. That is to say, a simulated moving bed is thus obtained in which the adsorbent undergoes a countercurrent contact with the fluid flow to continuously separate the components of the fluid mixture.

In the above, supply and discharge of the fluid stream are operated with use of a rotary valve provided with a plurality of annular grooves or a plurality of switching valves.

In the case of simulated moving bed making use of a rotary valve, the operation is made with use of, for example, conduits or pipes operatively connecting together the rotary valve and adsorbent chambers, and the arrangement is, for example, such that the fluid stream is passed through annular grooves in the rotary valve into adsorbent chambers through the connecting pipes or conduits. By intermittently rotating the rotary valve at constant intervals of time, shifting is made of the position of the fluid inlet and outlet ports.

In general, the adsorptive separation technique using the simulated moving bed requires a large number of adsorbent chambers resulting in an increased pressure loss of fluid. Therefore, the pressure of the fluid flowing in the rotary valve becomes necessarily large. Further, as the number of annular grooves that constitute a part of the fluid passage through the rotary valve increases, the contact area between the rotor and the stator disk also increases so that a large force is required to keep the rotor and stator disks in close contact so as to provide a tight seal for the fluid flowing in the rotary valve. This in turn makes the design of the rotary valve complex and costly. In addition the possibility of fluid leakage still remains.

SUMMARY

The research to overcome the aforementioned drawbacks has led us to the present invention. That is, the object of this invention is to reduce the overall pressure applied to the rotor and the stator disks of the rotary valve.

Another object of this invention is to eliminate the possibility of fluid leakage in the rotary valve.

The invention that achieves the above objectives provides a rotary valve having fluid passages which is characterized in that the rotary valve consists of: a plurality of stator disks having one or more passages that constitute a part of the complete fluid passages; and a rotor rotatably disposed between the stator disks, the rotor having passages which communicate with selected at least two of the fluid passages in the stator disks to form complete fluid passages.

With this invention, since the rotor is disposed between the two stator disks, a plurality of concentric annular grooves that have conventionally been provided to a single contact surface between the rotor and the stator disk can be divided and provided to two contact surfaces. This reduces the number of the concentric annular grooves provided to one contact surface and also reduces the contact area. This in turn results in a substantial reduction in the overall pressure which is applied to the rotor and the stator disks to keep a tight seal on the fluid. The external pressure to be applied is approximately equal to the fluid pressure in the annular groove times the contact area. Therefore, if we suppose the number of the annular grooves is reduced to half and the rotor diameter to half, the overall pressure required will be only ¼ the conventional pressure. This will help mitigate the requirement in the design of the rotary valve and eliminate the possibility of fluid leakage in the valve.

The material of the rotary valve does not restrict the range of the scope of this invention, but it is preferable to use the material having self-lubricating characteristic in the entire rotor or the contact surface of the rotor. The material satisfying this requirement includes teflon, teflon-impregnated glass cotton, fluorocarbon graphite, polyacetal resin, polyamide amide resin, nylon and polyester resin. Further, the rotor and/or the stator disks may be formed of ceramic.

THE DRAWINGS

FIG. 2 is a cross section of the rotary valve of this invention;

FIG. 3 is a cross section as viewed from the arrow Y—Y of FIG. 2;

FIG. 4 is a cross section as viewed from the arrow Z—Z of FIG. 2;

DESCRIPTION

Figure 1:
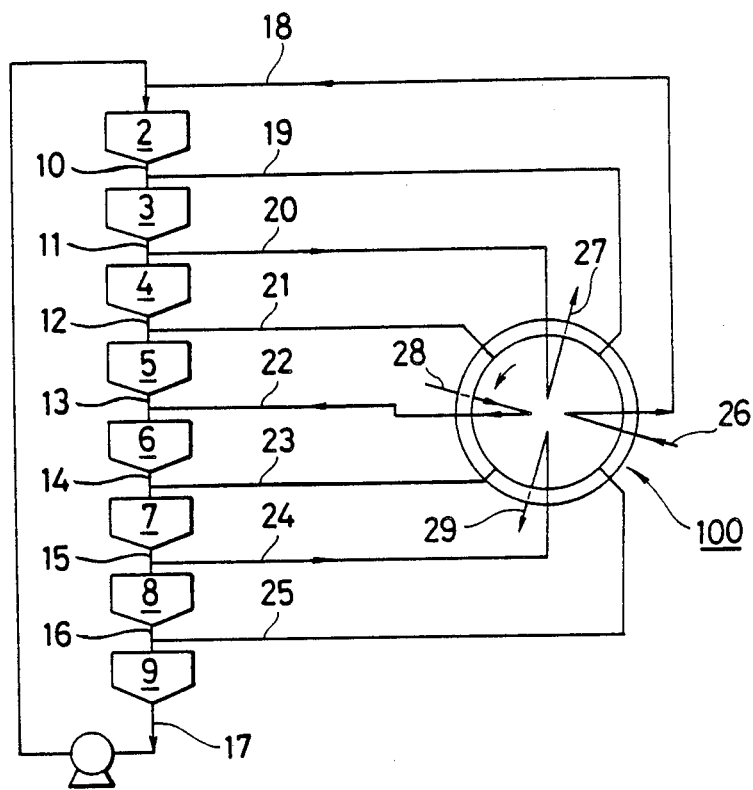
FIG. 1 is a schematic view of the adsorptive separation apparatus.

FIG. 1 is a schematic view of the adsorptive separation apparatus which has a plurality of adsorbent chambers 2 through 9 connected in series by pipes 10 through 17 forming a circulating path. Drawing out and supplying of fluid to or from the adsorbent chambers is carried out through pipes 18 trough 25 that connect the pipes 10 through 17 and a rotary valve 100. As the rotary valve 100 turns a certain angle at a predetermined time interval, the fluid supply pipes in the rotary valve (a desorbent material supply pie 26 and a mixture material supply pipe 28) and the extraction pipes (an extract drought pipe 27 and raffinate rawout pipe 29) move along the series of adsorbent chambers so that the adsorbent apparently moves up as opposed to the downward flow of fluid, thereby forming a simulated moving bed in which an adsorptive separation is carried out. In FIG. 1, the adsorbent chambers 2 and 3 form a desorption zone; the chambers 4 and 5 form a purification zone; chambers 6 and 7 form an adsorption zone; and chambers 8 and 9 collect the desorbent material and circulate it to the desorption zone.

The rotary valve 100 consists of a case 90 in which a rotor 40, a first stator disk 41 and a second stator disk 42 are installed with the rotor disposed between the two stator disks. The rotor 40 is intermittently rotated a predetermined angle at certain intervals by a shaft 39. Between the second stator disk 42 and a second internal surface 94 of the case 90 there is provided, if necessary, a coil spring 91 concentric with the shaft 39 to urge the first and second stator disks 41, 42 and the rotor 40 against the first internal surface 93 of the case 90 so as to prevent leakage of fluid from the contact surfaces between them. The second stator disk 42 has a through hole 92 through which the shaft 39 is passed.

On one end surface 40a (contacting the end surface 41a of the first stator disk 41), the rotor 40 is formed with a first annular groove 50 and a second annular groove 51. The first stator disk 41 is formed with a passage 60 communicating with the first annular groove 50 and a passage 61 communicating with the second annular groove 51. The material mixture supply pipe 28 is connected to the passage 60 while the raffinate extraction pipe 29 is connected to the passage 61.

The first stator disk 41 is also formed with a plurality of passages 70 through 77 (in this embodiment, eight passages) outside the annular groove 51. These passages 70 through 77 are arranged equidistant along the circumference S3 concentric with the shaft 39 and are connected with pipes 18 through 25 respectively (see FIG. 3). The first stator disk 41 is formed at the center with a passage 62, coaxial with the shaft 39, to which the extract drawout pipe 27 is connected.

On one end surface 42a (contacting the end surface 40b of the rotor 40) the second stator disk 42 is formed with a third annular groove 52 concentric with the shaft 39. The second stator disk 42 is also provided with a passage 78 communicating with the annular groove 52. The desorbent material supply pipe 26 is passed through the case 90 and connected to the passage 78

Figure 5:
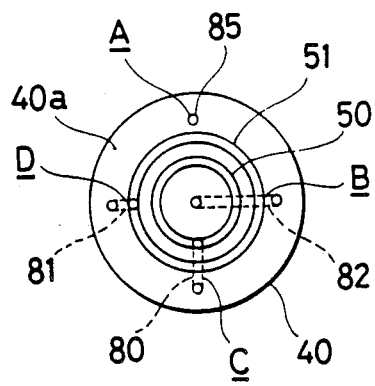
FIG. 5 is a cross section as viewed from the arrow Y"—Y" of FIG. 2.
Figure 6:
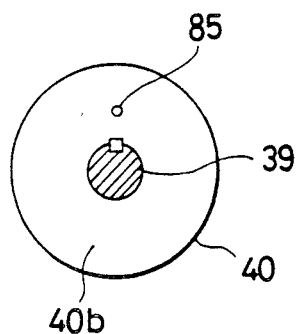
FIG. 6 is a cross section as viewed from the arrow Z"—Z" of FIG. 2.

The rotor 40 is provided with a plurality of passages. That is, under the condition shown in FIGS. 2 through 6, the rotor 40 has three U-shaped passages, i.e., a U-shaped passage 80 connecting the first annular groove 50 and the passage 74 of the first stator disk 41, a U-shaped passage 82 connecting the passages 62 and 72 of the first stator disk 41 (see FIG. 5), a U-shaped passage 81 connecting the second annular groove 51 and the passage 76 of the first stator disk 41 (see FIG. 5), and a passage 85 connecting the passage 70 of the first stator disk 41 and the third annular groove 52 formed in the second stator disk 42.

In the condition as shown in FIGS. 2 through 6, four paths are formed in the rotary valve 100 through which the fluid is passed. That is, (a) A path A connecting the passage 78, the third annular groove 52, the passage 85 and the passage 70, (b) A path B connecting the three passages 72, 82 and 62, (c) A path C connecting the passage 60, the first annular groove 50, the passage 80 and the passage 74, (d) A path D connecting the passage 76, the passage 81, the second annular groove 51 and the passage 61.

When the rotor 40 is given a ⅛ turn in the direction of arrow (FIGS. 1 and 2), the above paths are switched over newly forming the following paths.

(a') A path connecting the passage 78, the third annular groove 52, the passage 85 and the passage 71, (b') A path connecting the three passages 73, 82 and 62, (c') A path connecting the passage 60, the first annular groove 50, the passage 80 and the passage 75, (d') A path connecting the passage 77, the passage 82, the second annular groove 51 and the passage 61.

Similarly each time the rotor 40 is given a ⅛ turn in the direction of arrow intermittently, the paths in the rotary valve change, successively shifting the adsorbent chambers 2 to 8 to and from which the fluid is supplied and extract is drawn out. This makes the adsorbent apparently more upward as against the downward flow of the fluid whereby the adsorptive separation action is performed.

The first and second annular grooves 50, 51 may be provided to the first stator disk 41 or they may be provided astride the first stator disk 41 and the rotor 40. The third annular groove 52 may be provided to the rotor 40 or may be provided astride the rotor 40 and the second stator disk 42.

As can be seen from the foregoing, with the present invention, a path switching rotor is installed between the plurality of stator disks having a part of the fluid passages in the rotary valve, and a plurality of concentric annular grooves that have conventionally been formed in a single contact surface can be divided and formed in two separate contact surfaces so that overall pressure to keep the rotor and the stator disk in tight contact can be reduced. This makes the design of the rotary valve very simple and eliminates the fear of fluid leak in the rotary valve. Moreover, the pressure on both sides of the rotor balance each other providing tighter seal.

The adsorptive separation technique employing pressure swing adsorption is used in separation of oxygen and nitrogen in air and in refining of hydrogen gas. In the nitrogen adsorptive separation equipment, the rotary valve obviates the use of a number of open-close valves that have been used in the conventional equipment.

Figure 7:
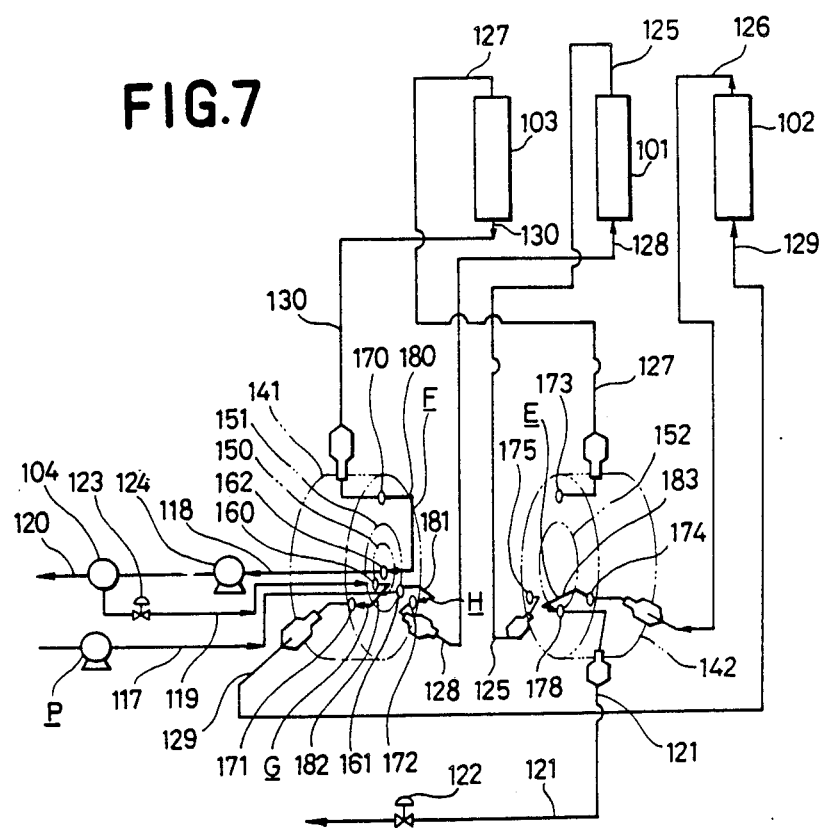
FIG. 7 is a schematic view of another adsorptive separation apparatus.
Figure 8:
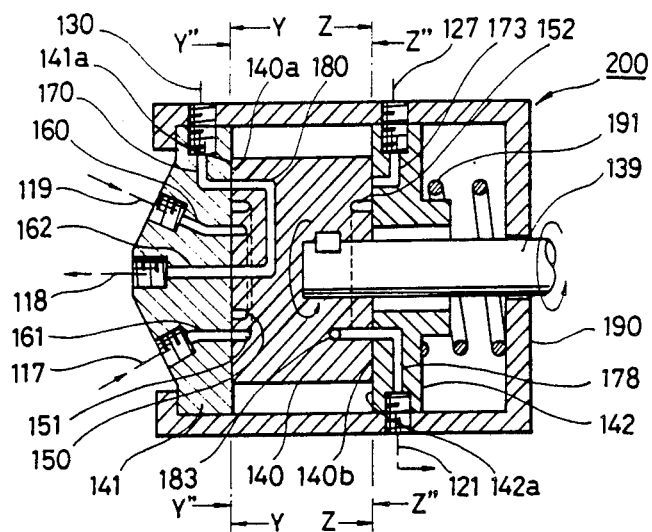
FIG. 8 is a cross section of other rotary valve of this invention.

FIG. 7 shows a schematic diagram of another adsorptive separation equipment and FIG. 8 shows its cross-sectional view. The rotary valve 200 used in this equipment consists of a case 190 and, within that case, a rotor 140, a first stator disk 141 and a second stator disk 142. The rotor 140 is installed between the first and second stator disks 141 and 142 and is adapted to rotate a certain angle at predetermined intervals intermittently. A coil spring 191 is provided concentric with the rotating shaft 139 between the second stator disk 142 and the case 190 to urge the rotor 140 and the second stator disk 142 against the first stator disk 141 so as to prevent leakage of fluid from the contact surfaces.

On one end surface 40a of the rotor 140 (contacting the end surface 141a of the first stator disk 141), first and second annular grooves 150, 151 are formed concentric with the shaft 139. The first stator disk 141 is formed with a passage 160 communicating with the first annular groove 150 and also formed with a passage 161 communicating with the second annular groove 151. The passage 160 is connected with a circulating gas introduction pipe 119 and the passage 161 with a mixture gas introduction pipe 117 (see FIG. 8).

Figure 9:
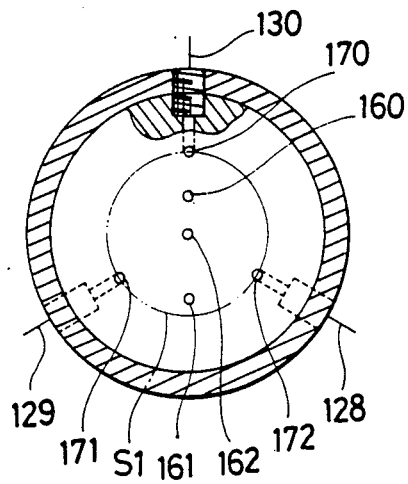
FIG. 9 is a cross section as viewed from the arrow Y—Y of FIG. 8.

The first stator disk 141 is also formed with a plurality of passages 170, 171, 172 (in this embodiment, three passages) outside the annular groove 151. These passages 170, 171, 172 are arranged equidistant on the circumference S1 concentric with the rotating shaft 139. To the passages 170, 171, 172 are connected pipes 130, 129, 128 respectively (see FIG. 9). At the center of the stator disk 141 a passage 162 is formed coaxial with the rotating shaft 139 and is connected with the separation gas introduction pipe 118.

On the other hand, the other end surface 140b of the rotor 140 (contacting the end surface 142a of the second stator 142) is formed with a third annular groove 152 concentric with the rotating shaft 139. The second stator disk 142 is formed with a passage 178 communicating with the annular groove 152. The passage 178 is connected with the exhaust gas introducing pipe 121 that passes through the case 190.

Figure 10:
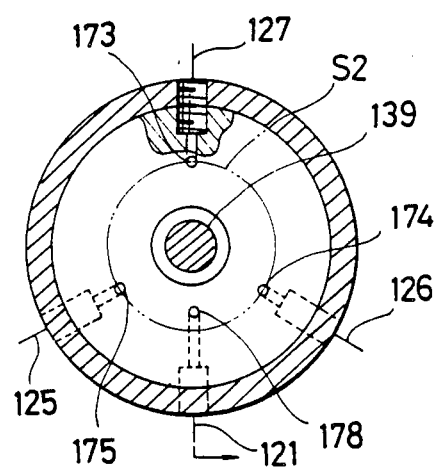
FIG. 10 is a cross section as viewed from the arrow Z—Z of FIG. 8.
Figure 11:
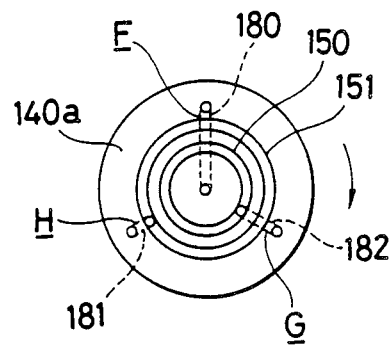
FIG. 11 is a cross section as viewed from the arrow Y"—Y" of FIG. 8.
Figure 12:
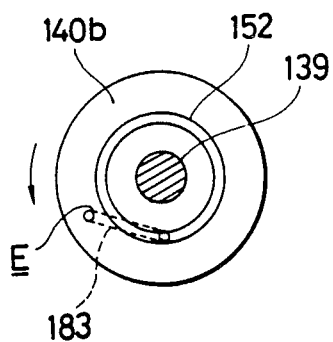
FIG. 12 is a cross section as viewed from the arrow Z"—Z" of FIG. 8.

The second stator disk 142 is formed with a plurality of passages 173, 174, 175 (in this case, three passages) outside the third annular groove 152. These passages 173, 174, 175 are arranged equidistant along the circumference S2 concentric with the rotating shaft 139. To these passages are connected pipes 127, 126, 125 respectively (see FIG. 10).

The rotor 140 has also another set of passages. That is, in the condition as shown in FIGS. 7 through 12, the rotor 140 is provided with a U-shaped passage 180 connecting the passage 162 of the first stator disk 141 coaxial with the shaft 139 and the passage 170 of the first stator disk 141; a U-shaped passage 182 (see FIG. 11) connecting the first annular groove 150 and the passage 171 of the first stator disk 141; and a U-shaped passage 181 (see FIG. 11) connecting the outer annular groove 151 and the passage 172 of the first stator disk 141.

On the other end surface the rotor 140 is formed with a U-shaped passage 183 (see FIG. 12) connecting the annular groove 152 and the passage 174 of the second stator disk 142.

Thus, under the condition shown in FIGS. 8 through 12, four paths are formed in the rotary valve 200 through which the fluid passes. That is, (a) A path E connecting the passage 174, the annular groove 152, the passage 183 and the passage 178, (b) A path F connecting the three passages 170, 180 and 162, (c) A path H connecting the passage 161, the annular groove 151, the passage 181 and the passage 172, (d) A path H connecting the passage 161, the annular groove 151, the passage 181 and the passage 172.

In addition to the above fourth paths two interrupted paths are formed. That is, under conditions shown in FIGS. 8 through 12, (e) the end of the passage 173 and (f) the end of the passage 175 are closed by the rotor 140. The adsorption towers 101, 102, 103 are filled with Zeolite adsorbent.

The adsorption tower 101 is connected at the top with a pipe 125 and at the bottom with a pipe 128. The adsorption tower 102 is connected at the top with a pipe 126 and at the bottom with a pipe 129. The adsorption tower 130 is connected at the top with a pipe 127 and at the bottom with a pipe 103 (see FIG. 7).

The air pressurized to higher than the atmospheric pressure introduced through the mixture gas introduction pipe 117, passage 161, annular groove 151, passage 181, passage 172, the pipe 128 and to the adsorption tower 101 where the desorption operation has been complete. (The compressor for pressurizing the air is depicted as P). At this time the end of the passage 175 is closed by the rotor 140 and therefore the adsorption tower 101 is undergoing the adsorption operation by increasing the pressure.

To the adsorption tower 102 where the adsorption operation has been completed, a reflux gas enriched with nitrogen is supplied through the reflex gas introduction pipe 119, the passage 160, the annular groove 150, the passage 182, the passage 171 and the pipe 129. The exhaust gas enriched with oxygen removed by the reflux gas is discharged through the pipe 126, the passage 174, the passage 183, the annular groove 152, the passage 178 and to the exhaust gas discharging pipe 121. The pressure in the adsorption tower 102 is controlled at a predetermined pressure by the pressure regulator valve 122. At this time the adsorption tower 102 is undergoing the concentration operation.

From the adsorption tower 103 where the concentration operation has been completed, a nitrogen gas which was enriched by the concentration operation is drawn out through the pipe 130, the passage 170, to passage 180, the passage 162 and the enriched nitrogen gas introduction pipe 118 and into the compressor 124 which is reducing the pressure of the adsorption tower 103 to desorb the enriched nitrogen adsorbed on adsorbent in the adsorption tower 103. At this time the adsorption tower 103 is undergoing the desorption operation. The gas drawn in by the compressor 124 is pressurized at the outlet of the compressor to the concentration operation pressure or more and then led to the surge tank 104. A part of the gas is taken out as the product from the surge tank 104 through the product gas discharging pipe 120. The remaining gas is led through the pressure reducing valve 123 to the reflux gas introduction pipe 119 for use in the reflux gas concentration operation.

When the rotor 140 is given a ⅙ turn in the direction of arrow (FIG. 8), the four paths, E, F, G, H and two interrupted paths are switched over to form the following paths.

(a') A path connecting the passage 175, the annular groove 152, the passage 183 and the passage 178,
(b') A path connecting the three passages 171, 180 an 162,
(c') A path connecting the passage 160, the annular groove 150, the passage 182 and the passage 172,
(d') A path connecting the passage 161, the annular groove 151, the passage 181 and the passage 170,
(e') A closed passage 174,
(f') A closed passage 173.

The adsorption towers 101, 102 and 103 perform to the reflux gas concentration operation, the desorption operation and the adsorption operation in turn.

In a similar way, each time the rotor 140 is given another ⅙ turn, the paths in the rotary valve 140 are switched over changing the sequence of supply and discharging of fluid to and from the adsorption towers 101, 102, 103 of FIG. 7, thereby repeating the adsorption operation by increasing pressure, the reflux gas concentration operation and the desorption operation by decreasing pressure. In this way the nitrogen is separated and collected from the air.

In this embodiment of path E through which the fluid passes is arranged on one side of the rotor while the remaining paths F, G and H are arranged on the other side of the rotor 140. This construction makes the arrangement of the annular grooves and connecting passages simpler than in the first embodiment and also facilitates the design of the rotary valve.

Figure 13:
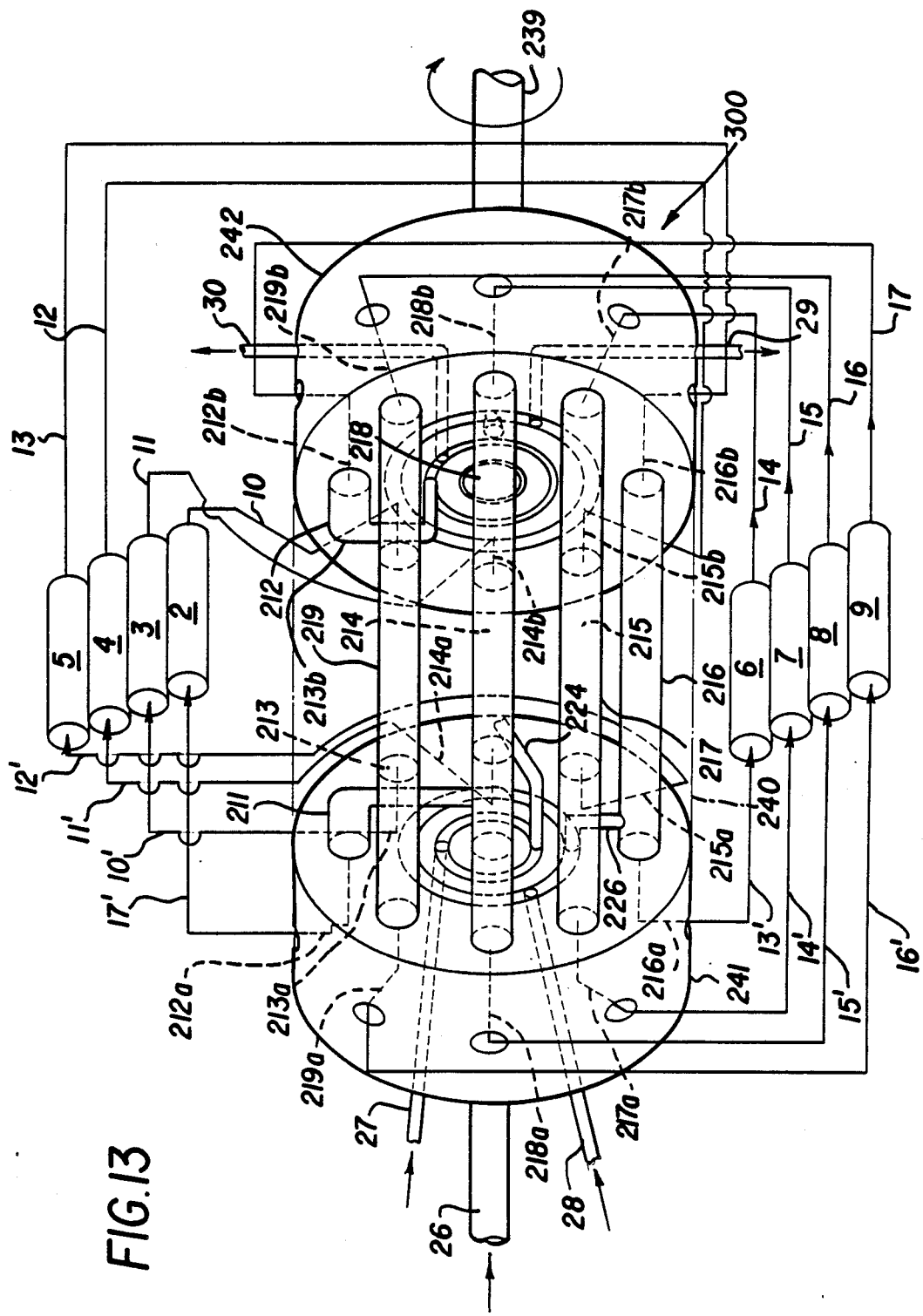
FIG. 13 shows a schematic view of the adsorption-treating apparatus embodying the present invention.

FIG. 13 is taken to illustrate, in particular, the function of a rotary valve and the interconnection of adsorbent chambers, for practicing the present invention.

As shown, adsorbent chambers 2–9 charged with an adsorbent are connected in series and in a manner of forming a circulatory flow path, by pipes through a rotary valve 300. A desorbent supply pipe 26, a mixture-material supply pipe 28, the extract drawout pipe 27 and a raffinate drawout pipe 29 are arranged in the rotary valve 300 so as to be in communication with prescribed pipes interconnecting the adsorbent chambers, to form a continuous flow path. The reference numeral 30 denotes an adsorbent drawout pipe.

In operation of the apparatus of the invention, the rotary valve 300 is rotated in the clockwise direction intermittently at the prescribed time interval, when a desorption zone, a purification zone and an adsorption zone are successively shifted and a continuous treatment of a mixture-material fluid can be carried out. In the condition illustrated in FIG. 13, the desorption zone is formed by adsorbent chambers 2 and 3, the purification zone is formed by chamber 4 and 5, and the adsorption zone, by chambers 6 and 7, the chambers 8 and 9 forming a recovery zone, functioning to recover and recycle the desorbent.

Figure 14:
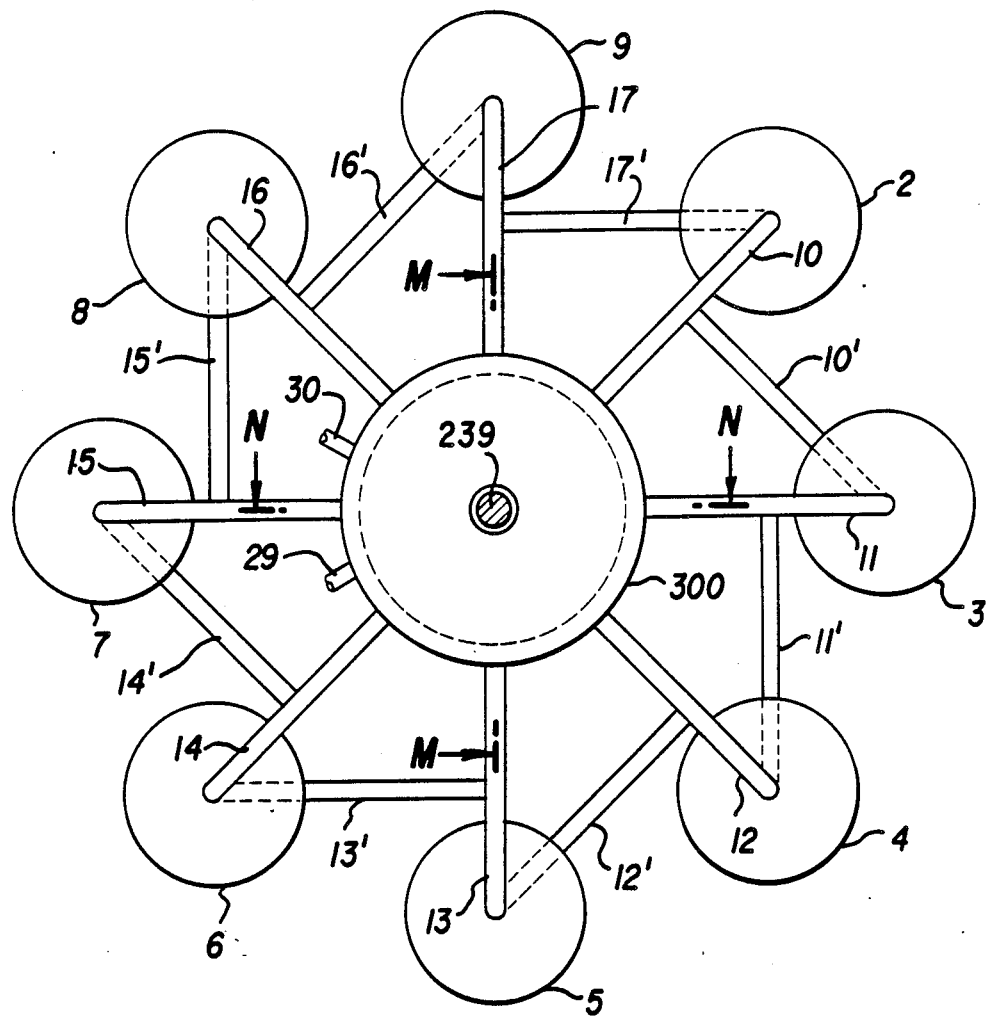
FIG. 14 is a plan view of the adsorption-treating apparatus.
Figure 15:
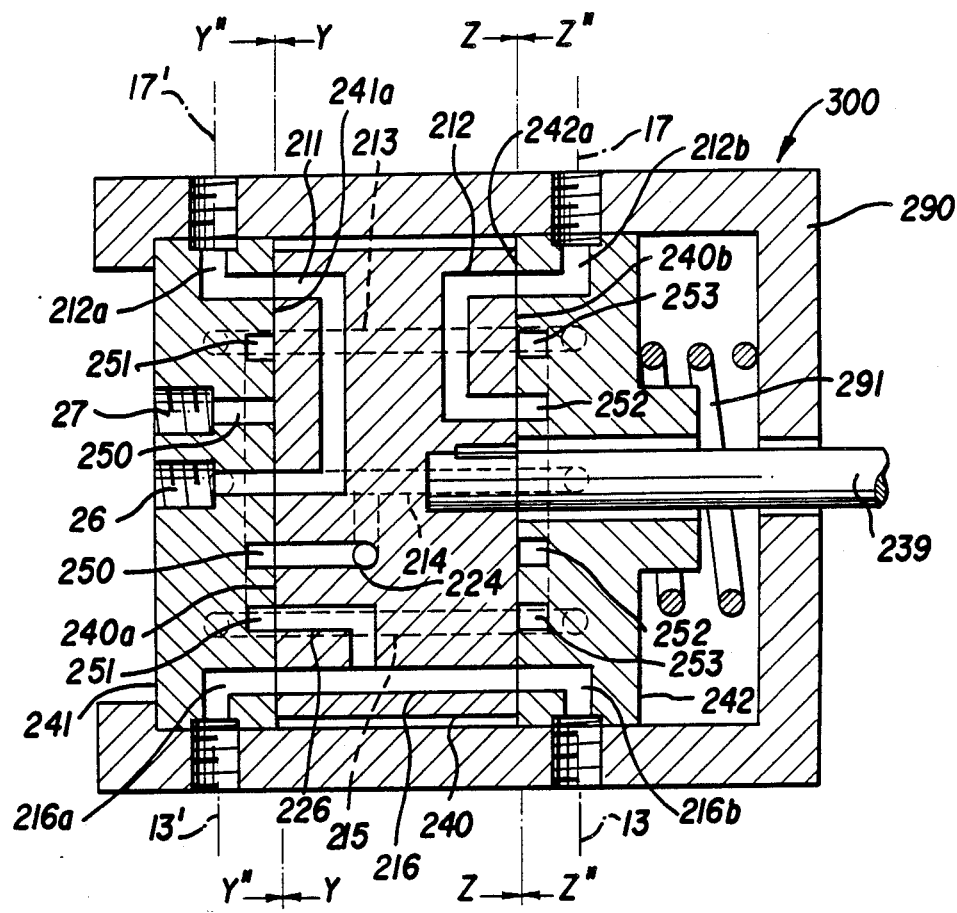
FIG. 15 is a sectional view taken on line M—M in FIG. 14.
Figure 16:
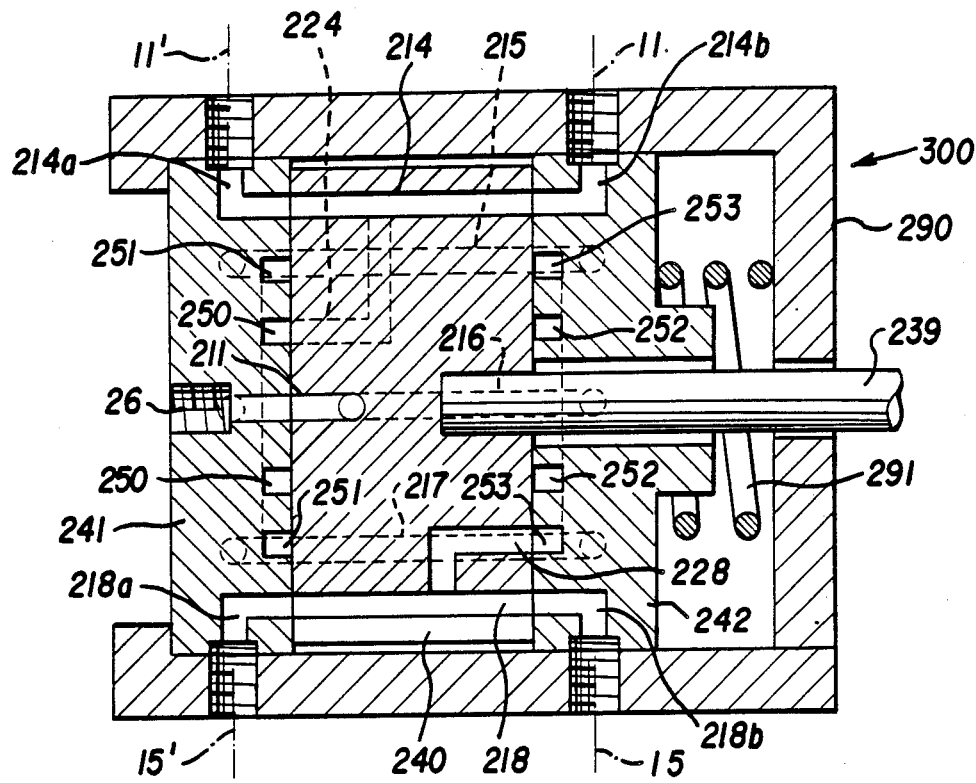
FIG. 16 is a sectional view taken on line N—N in FIG. 14.
Figure 17:
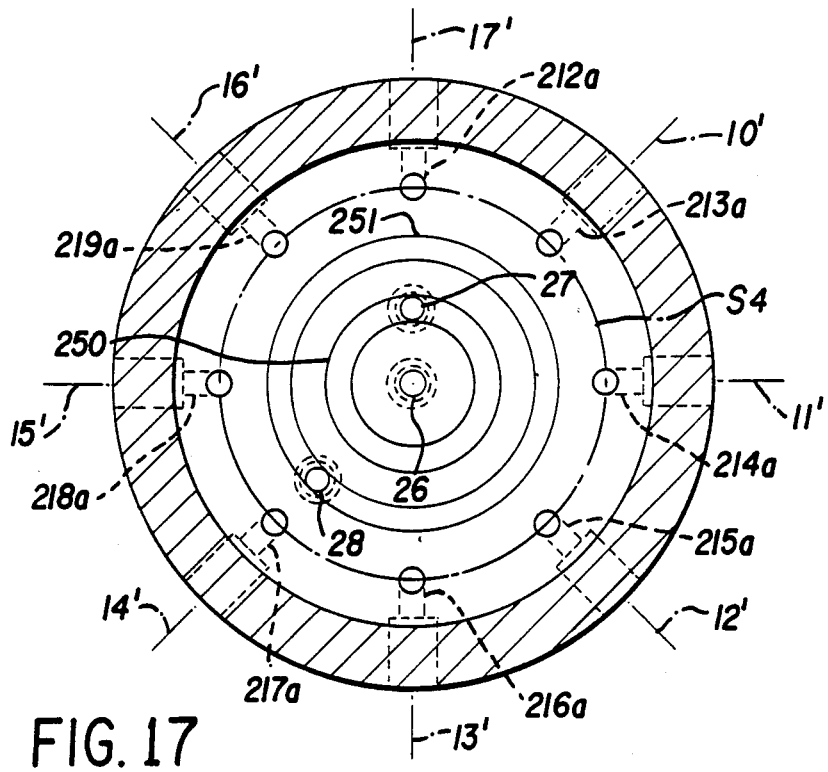
FIG. 17 is a sectional view, seen in the direction of arrows Y in FIG. 15.

FIG. 14 shows an example of the adsorption-treating apparatus embodying the present invention, and as shown in FIG. 15, the rotary valve 300 for use in this apparatus is provided with a rotor 240, a first stator disk 241 and a second stator disk 242, housed in a casing 290. The rotor 240 is disposed between the first and the second stator disks 241 and 242 and is rotated to the prescribed time interval, ⅛ of a full turn each time, by a driving shaft 239. To maintain the rotor 240 in close contact with the first and the second stator disks 241 and 242, a coiled spring 291 is mounted between the second stator disk 242 and the casing 290. The end face of the stator disk 241, abutting against the corresponding end face of the rotor 240, is provided with a first annular groove 250 and a second annular groove 251 concentric with the shaft 239. As shown in FIG. 17, the first annular groove 250 is in communication with the extract drawout pipe 27, and the second annular groove 251 is in communication with the mixture-material supply pipe 28. Radially outwardly of the first annular groove 250, the first stator disk 241 is further provided with passages 212a, 213a, 214a, 215a, 216a, 217a, 218a and 219a, which passages are equidistantly arranged on a circle $S_4$ concentric with the shaft 239. The first stator disk 241 is provided, in the center thereof, with the desorbent supply pipe 26.

Figure 18:
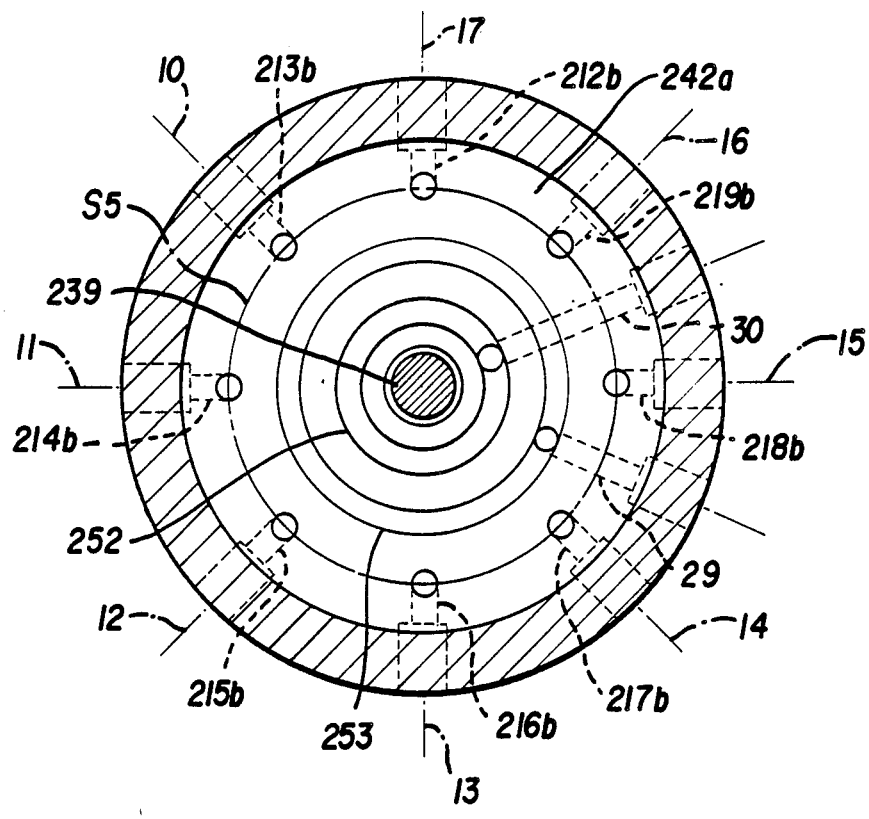
FIG. 18 is a sectional view, seen in the direction of arrows Z in FIG. 15.

Similar to the first stator disk 241, the second stator disk 242 has an end face 242a, which is provided with a third annular groove 252 and a fourth annular groove 253 concentric with the shaft 239. As shown in FIG. 18, the third annular groove 252 is in communication with the pipe 30 for recycling the desorbent thereto, and the fourth annular groove 253 is in communication with the raffinate drawout pipe 29. Radially outwardly of the fourth annular groove 253, the second stator disk 242 is further provided with passages 212b, 213b, 214b, 215b, 216b, 217b, 218b and 219b, which passages are equidistantly spaced on a circle $S_5$ concentric with the shaft 239.

As shown in FIG. 13, the rotor 240 is formed with seven linear passages 213, 214, 215, 216, 217, 218 and 219, a first and a second U-shaped passages 211 and 212 respectively, and three L-shaped by-pass pies 224, 226 and 228. In the operation condition shown in FIG. 13, the passage 213 is in communication with passages 213a and 213b. Likewise, the passage 214 is in communication with passages 214a and 214b, the passages 215 with passages 215a and 215b, the passage 216 with passages 216a and 216b, the passage 217 with passages 217a and 217b, the passage 218 with passages 218a and 218b, and the passage 219 with passages 219a and 219b. The first U-shaped passage 211 has its one end connected to the passage 212a and its other end connected to the mixture-material supply pipe 26, while the second U-shaped passage 212 has its one end connected to the passage 212b and its other end connected to the third annular groove 252. The by-pass pipe 224 from the passage 214 is in communication with the first annular groove 250, the by-pass pipe 226 from the passage 216 is in communication with the second annular groove 251, and the by-pass pipe 228 from the passage 218 is in communication with the fourth annular groove 253.

Figure 19:
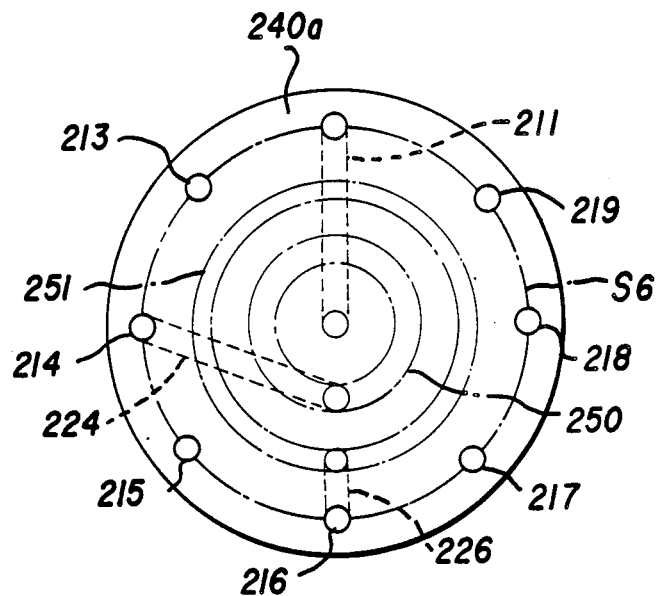
FIG. 19 is a sectional view, seen in the direction of arrows Y" in FIG. 15.
Figure 20:
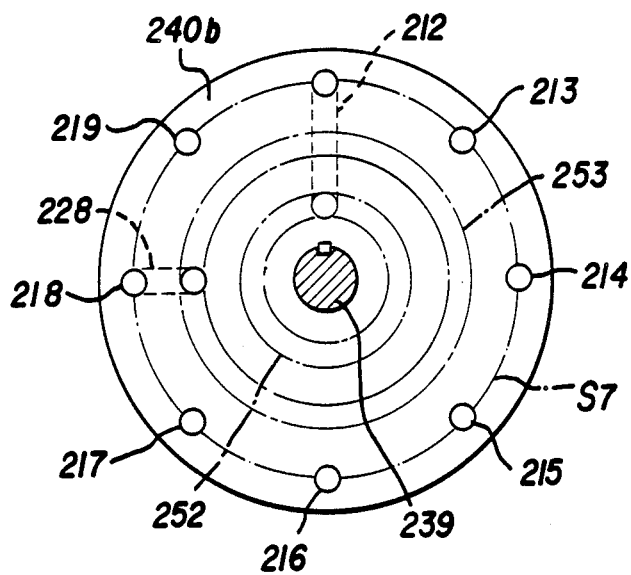
FIG. 20 is a sectional view, seen in the direction or arrows Z" in FIG. 15.

Thus, as shown in FIG. 19, passages 211, 213, 214, 215, 216, 217, 218 and 219 in the rotor 240 are opened, at their respective one ends, on a circle $S_6$ on the end face 240a of the rotor 240, this circle $S_6$ facing the circle $S_4$ on the first stator disk 241. As shown in FIG. 20, further, the respective other ends of passages 213, 214, 215, 216, 217, 218 and 219 and one end of the passage 212 are opened on a circle $S_7$ on an end face 240b of the rotor 240, which circle is confronted with the circle $S_5$ on the second stator disk 242.

Then, reverting to FIG. 13, the passage 212a is connected through a pipe 17' to one end of the adsorbent chamber 2, of which the other end is connected to the passage 213b through a pipe 10. The passage 213a is connected through a pipe 10' to one end of the adsorbent chamber 3, of which the other end is connected to the passage 214b through a pipe 11. The passage 214a is connected through a pipe 11' to one end of the adsorbent chamber 4, the other end of which is connected to the passage 215b through a pipe 12. The passage 215a is connected through a pipe 12' to one end of the absorbent chamber 5, of which the other end is connected to the passage 216b through a pipe 13. The passage 216a is connected through a pipe 13' to one end of the adsorbent chamber 6, of which the other end is connected to the passage 217b through a pipe 14. The passage 217a is connected through a pipe 14' to one end of the adsorbent chamber 7, of which the other end is connected to the passage 218b through a pipe 16. The passage 218a is connected through a pipe 15' to one end of the adsorbent chamber 8, of which the other end is connected to the passage 219 through a pipe 16. The passage 219a is connected through a pipe 16' to one end of the adsorbent chamber 9, of which the other end is connected to the passage 212b through a pipe 17.

In the condition shown in FIG. 13, a desorbent supplied from the supply pipe 26 is passed through the desorption zone formed by the adsorbent chambers 2 and 3 and, during its passage through this zone, expels a strong adsorbed component on an adsorbent, and an extract containing the desorbent and the strong adsorbed component is drawn out from the extract draw-out pipe 27. The effluent from the desorption zone is passed through the purification zone formed by the adsorbent chambers 4 and 5 and, during its passage through this zone, contacted with an adsorbent which has selectively adsorbed the strong adsorption component, whereby the concentration of purity of the strong adsorbed component is increased. The effluent from the purification zone and a mixture-material from the supply pipe 28 are guided into the adsorption zone formed by the adsorbent chambers 8 and 9, and a portion thereof having a high concentration of the desorbent is drawn out from the pipe 30. The desorbent drawn out from the pipe 30 may be recycled in the desorption zone.

At certain time intervals, the rotor 240 is rotated, $\frac{1}{8}$ of full turn at each time, when shifting can occur of the respective zone and their forming adsorbent chambers, such as the desorption zone formed by adsorbent chambers 3 and 4, the purification zone formed by chambers 5 and 6, the adsorption zone by chambers 7 and 8, and the recovery zone by chambers 9 and 2.

We claim:
1. An adsorption-treating apparatus, comprising:
   a plurality of adsorbent chambers, each charged with an adsorbent and altogether forming a desorption zone, a purification zone and an adsorption zone connected in series in that sequence; and
   a rotay valve means for successively switching the supplying and drawing-out, to and from said chamber of a liquid to be treated in order to successively shift the desorption zone, the purification zone and the adsorption zone, in response to the rotation of said rotary valve means, wherein said rotary valve means includes,
   a first stator,
   a second stator, and
   a rotor rotatably disposed between said first stator and said second stator, and wherein said rotor includes connecting passages for connecting each adjacent adsorbent chamber through said first stator, said rotor and said second stator, and L-shaped by-pass passages branched from portions of said connecting passages within said rotor, wherein said L-shaped bypass passages are connected with external liquid supply pipes through one of said first stator and said second stator or connected with external liquid draw-out pipes through one of said first stator and said second stator.

2. The adsorption-treating apparatus of claim 1, wherein said L-shaped by-pass passages and said liquid supply pipes or said liquid draw-out pipes are communicated with one another through annular grooves provided on at least one contacting surface of either one of said first stator and said second stator or of said rotor.

* * * * *